(12) United States Patent
Kitajima

(10) Patent No.: US 9,135,519 B2
(45) Date of Patent: Sep. 15, 2015

(54) PATTERN MATCHING METHOD AND PATTERN MATCHING APPARATUS

(71) Applicant: CANON KABUSHIKI KAISHA, Tokyo (JP)

(72) Inventor: Hiroshi Kitajima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/324,951

(22) Filed: Jul. 7, 2014

(65) Prior Publication Data

US 2015/0016731 A1   Jan. 15, 2015

(30) Foreign Application Priority Data

Jul. 10, 2013   (JP) .................................. 2013-144164

(51) Int. Cl.
*G06K 9/48* (2006.01)
*G06K 9/46* (2006.01)

(52) U.S. Cl.
CPC .................................... *G06K 9/4638* (2013.01)

(58) Field of Classification Search
CPC ... G06K 9/4609; G06K 9/4638; G06T 7/0085
USPC .......... 382/199, 294, 298, 299, 300, 170, 254
See application file for complete search history.

(56) References Cited

U.S. PATENT DOCUMENTS

2010/0034476 A1\* 2/2010 Kido ............................ 382/243

FOREIGN PATENT DOCUMENTS

JP   2010-091525 A   4/2010

\* cited by examiner

*Primary Examiner* — Mike Rahmjoo
(74) *Attorney, Agent, or Firm* — Fitzpatrick, Cella, Harper, Scinto

(57) ABSTRACT

According to an aspect of the present invention, there is provided a pattern matching method of detecting an image of a detection target from a search image, comprising: obtaining a reference image of the detection target; generating the model edge image on a basis of the reference image; generating the edge extraction domain that is specified as a portion where the model edge image can exist by overlying a plurality of the model edge images obtained with at least one of rotating the model edge image within a predetermined range around a rotation center of the model edge image and translating the model edge image within a predetermined range; and performing pattern matching between the model edge image and the search edge image.

7 Claims, 10 Drawing Sheets

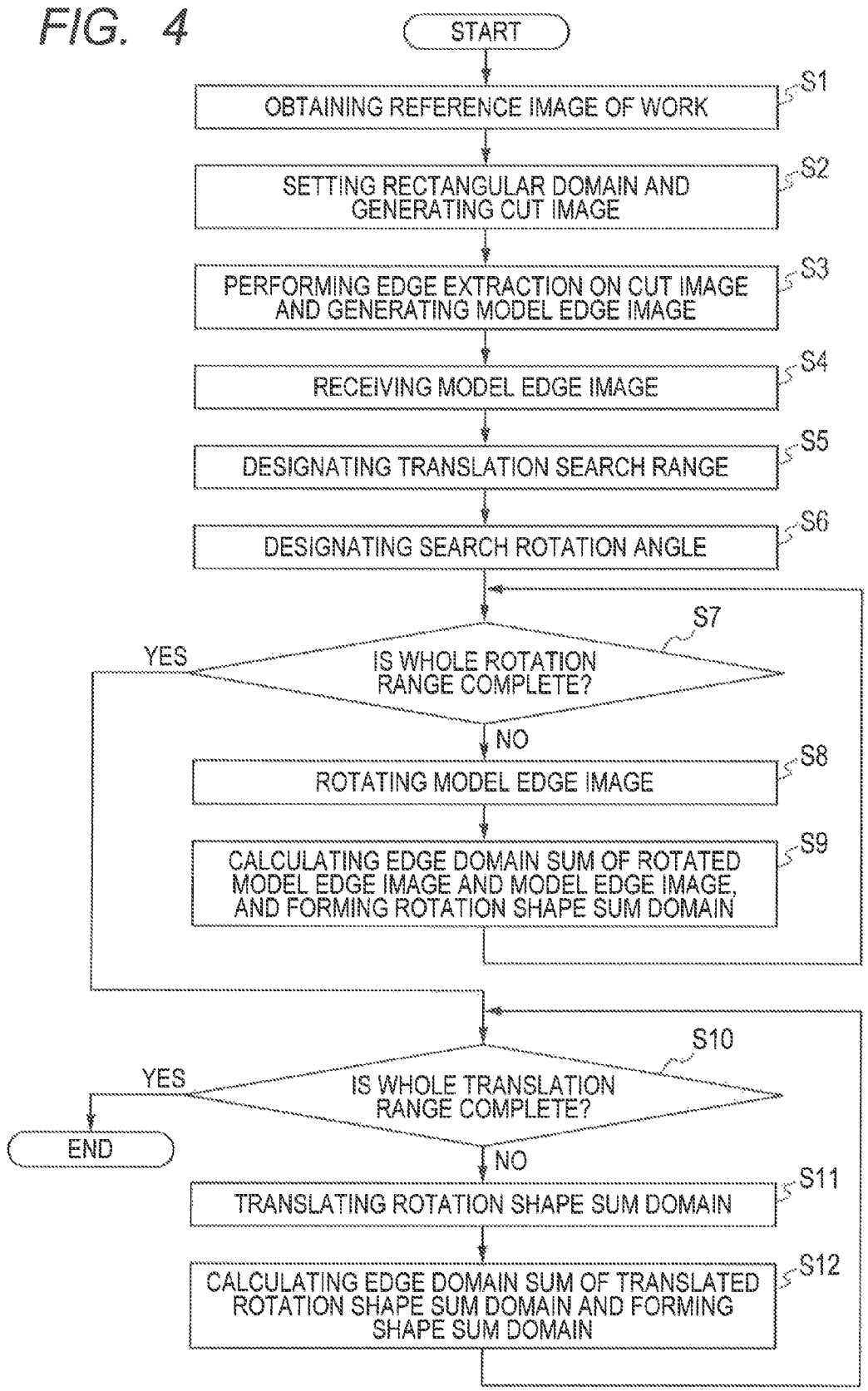

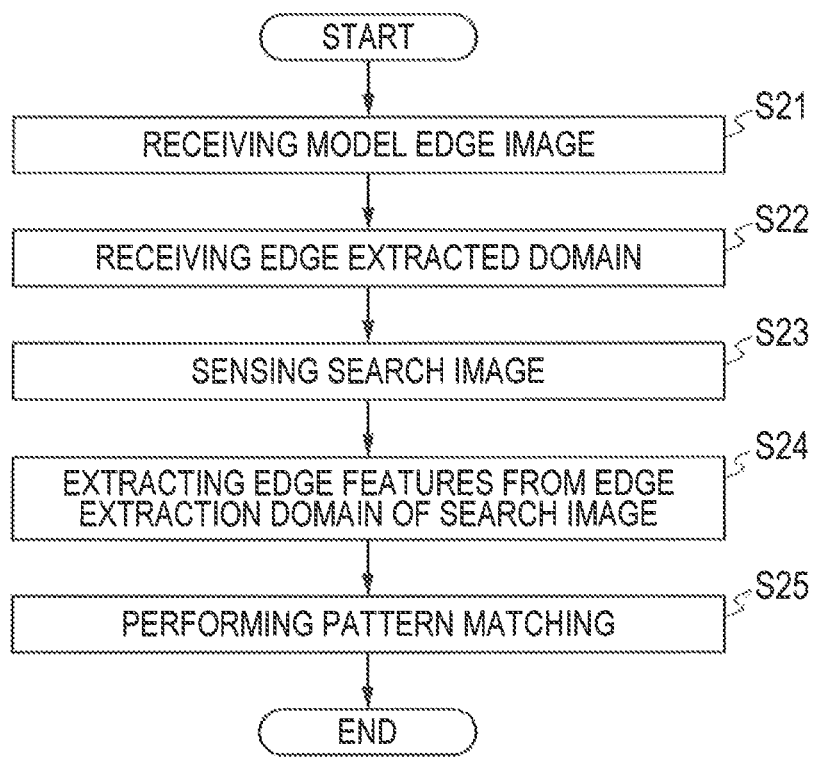

PATTERN MATCHING METHOD AND PATTERN MATCHING APPARATUS

BACKGROUND OF THE INVENTION

1. Field of the Invention

The present invention relates to a pattern matching method and pattern matching apparatus for performing pattern matching between a search edge image generated based on a search image, and a model edge image generated based on a detection target.

2. Description of the Related Art

In the field of image processing, pattern matching methods are conventionally well known as methods of detecting the position of, e.g., a work as a detection target. Of these methods, shape pattern matching (to be referred to as pattern matching hereinafter) has widely spread because it is a method which is strong against an illumination change and the hiding and missing of an object and has a high robustness.

In the pattern matching, the similarity is calculated by using the shape features of a model (reference image) and search image, so it is necessary to extract the shape features of the images. As a method of extracting the shape feature, an edge extraction method such as a Sobel filter or Canny filter is generally known. Since edge extraction for a model can be performed before an actual search process, the processing time poses almost no problem. However, edge extraction for a search image (i.e., image to be searched) must be performed simultaneously with an actual search process. Therefore, it is important to shorten the processing time for the actual search process.

To solve this problem, a pattern matching method has been proposed by which an edge extraction domain as a target of edge extraction is narrowed down to a part of a search image, thereby making the processing speed higher than that when performing edge extraction for the entire search image (see Japanese Patent Application Laid-Open No. 2010-091525). This pattern matching method generates a model edge image by extracting only an edge near the corner of a detection target as a model edge image. In an actual search process, corner detection is first performed on a search image, edge extraction is then performed in only a peripheral domain of the detected corner, and pattern matching is performed using a pregenerated model edge image of the corner. Since the domain as an edge extraction target is thus narrowed down to the periphery of the corner, the processing time can be made shorter than that when performing edge extraction on the entire search image.

In the pattern matching method described in Japanese Patent Application Laid-Open No. 2010-091525, however, a detection target must have a corner. This makes the method inapplicable to a detection target having no corner such as a circle. Also, if a corner-like shape which is not a detection target exists in the background of the detection target, the method detects the corner other than the detection target, and hence cannot narrow down the edge extraction domain.

The present invention provides a pattern matching method and pattern matching apparatus capable of increasing the speed of a pattern matching process by specifying an edge extraction domain from a search image without using any specific shape feature such as a corner.

SUMMARY OF THE INVENTION

According to an aspect of the present invention, there is provided a pattern matching method of detecting an image of a detection target from a search image obtained by imaging the detection target by performing pattern matching between the search edge image and a model edge image concerning the detection target, comprising: obtaining a reference image of the detection target; generating the model edge image on a basis of the reference image; generating the edge extraction domain that is specified as a portion where the model edge image can exist by overlying a plurality of the model edge images obtained with at least one of (i) a rotation process of rotating the model edge image within a predetermined range around a rotation center of the model edge image, (ii) an enlargement/reduction process of enlarging/reducing the model edge image within a predetermined range around the rotation center, and (iii) a translation process of translating the model edge image within a predetermined range; and performing pattern matching between the model edge image and the search edge image generated by performing edge extraction process for the edge extraction domain in the search image.

According to another aspect of the present invention, there is provided a pattern matching apparatus comprising: a storage unit configured to store at least the search edge image and the model edge image; and a calculator configured to perform pattern matching between the search edge image and the model edge image, wherein the calculator executes the above-described pattern matching method.

Further features of the present invention will become apparent from the following description of exemplary embodiments with reference to the attached drawings.

BRIEF DESCRIPTION OF THE DRAWINGS

FIGS. 1A, 1B and 1C are explanatory views showing an outline of the arrangement of a robot system according to the first embodiment of the present invention, in which FIG. 1A is a side view of the whole system, FIG. 1B is a plan view of a work gripped by a hand, and FIG. 1C is a sensed image of FIG. 1B.

FIGS. 3A, 3B and 3C are explanatory views showing a search image according to the first embodiment of the present invention, in which FIG. 3A shows a state in which one model edge image is overlaid, FIG. 3B shows a state in which a rotation shape sum domain is generated by rotating the model edge image, and FIG. 3C shows a state in which the rotation shape sum domain is translated.

FIG. 4 is a flowchart showing a procedure of generating an edge extraction domain by the pattern matching apparatus according to the first embodiment of the present invention.

FIGS. 5A, 5B and 5C are explanatory views showing a procedure of generating a model edge image according to the first embodiment of the present invention, in which FIG. 5A shows a reference image from which a cut image is cut out, FIG. 5B shows vectors of one pixel, and FIG. 5C shows a model edge image generated from the cut image.

FIGS. 6A, 6B, 6C and 6D are explanatory views showing a procedure of generating an edge extraction domain according to the first embodiment of the present invention, in which FIGS. 6A to 6C illustrate states in which a rotation shape sum domain is generated by sequentially rotating and overlaying model edge images, and FIG. 6D shows a state in which the rotation shape sum domain is translated.

FIG. 7 is a flowchart showing a procedure of executing a pattern matching process by the pattern matching apparatus according to the first embodiment of the present invention.

FIGS. 9A and 9B are views for explaining the procedure of generating a model edge image by the pattern matching apparatus according to the second embodiment of the present invention, in which FIG. 9A shows the relationship between the coordinate system of three-dimensional shape data and a camera coordinate system, and FIG. 9B shows the relationship between the three-dimensional shape data and a cut image.

DESCRIPTION OF THE EMBODIMENTS

Embodiments for carrying out the present invention will now be explained in detail with reference to the accompanying drawings.

First Embodiment

Figure 1A:
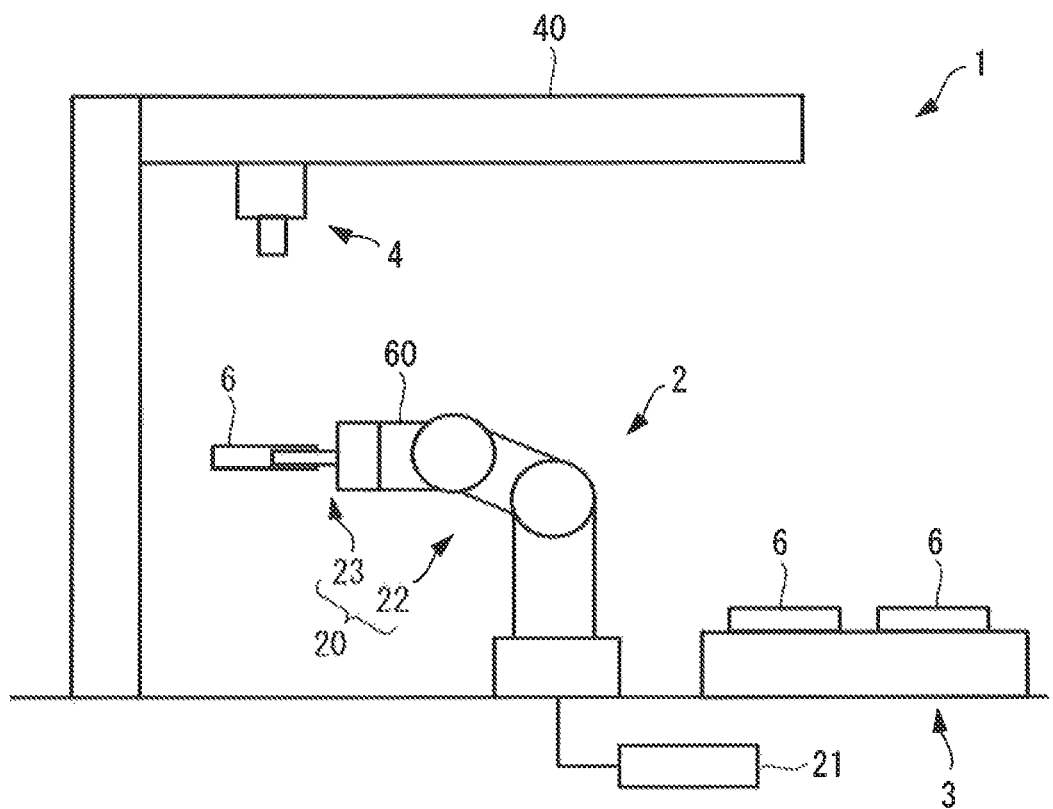
Figure 1B:
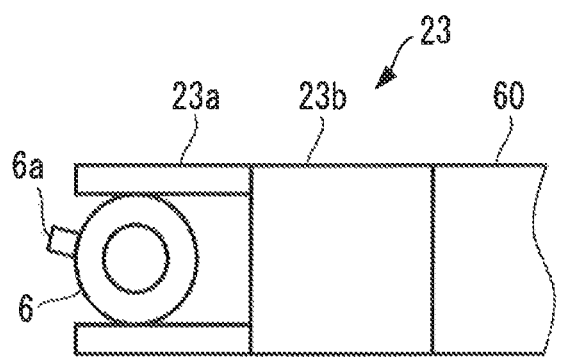
Figure 1C:
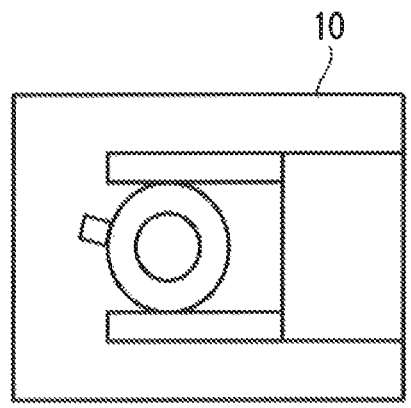

As shown in FIGS. 1A to 1C, a robot system 1 includes a robot apparatus 2, a work supply apparatus 3 for supplying works 6 to the robot apparatus 2, a camera 4, and a control apparatus 21 for controlling the robot apparatus 2 and the camera 4.

The robot apparatus 2 can process the work (detection target) 6, and includes a robot main body 20, and the control apparatus 21 controls the robot main body 20 and camera 4. As an example of the work 6, the work 6 in FIGS. 1A to 1C has an annular shape, and partially includes a projection 6a which projects outward in the radial direction so as to function as a phase reference part. Although the projection 6a is the phase reference part of the work 6, the present invention is not limited to this, and the phase reference part may also be, e.g., a mark. The camera 4 is fixed on a camera fixing base 40, and capable of sensing, from above, an image of the work 6 supplied to the robot apparatus 2 by the work supply apparatus 3, i.e., the work 6 gripped by a hand 23. Note that the shape of the work 6 is not limited to this. In the following descriptions, for simple explanation, the work 6 in FIGS. 3A to 3C has a circular cylindrical shape and the work 6 in FIGS. 5A to 5C, 6A to 6D, and 9A and 9B has a triangular prism shape.

The robot main body 20 includes a 6-axis vertical multi-joint arm (to be referred to as an arm hereinafter) 22, and the hand 23 as an end effector. In this embodiment, a 6-axis vertical multijoint arm is applied as the arm 22. However, the number of axes may also be changed in accordance with an application or purpose. Also, the hand 23 is applied as an end effector in this embodiment, but the present invention is not limited to this, and it is possible to use all tools capable of holding the work 6.

Figure 2:
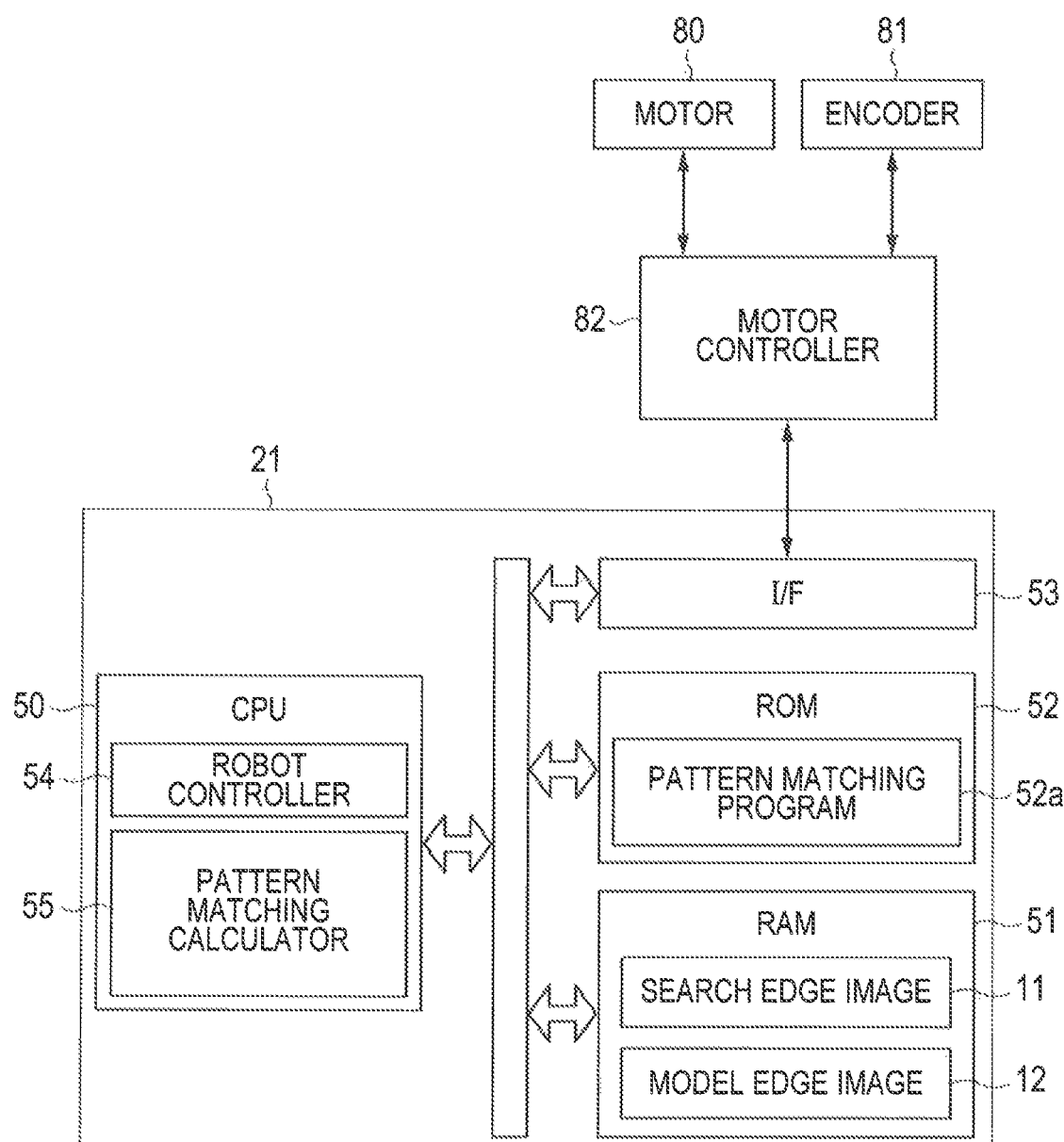
FIG. 2 is an explanatory view showing a pattern matching apparatus according to the first embodiment of the present invention.

The arm 22 includes seven links, and six joints which connect the links so that each link can swing or pivot. A link having a fixed length is adopted as each link. However, it is also possible to adopt a link capable of expanding and contracting by a linear actuator. As shown in FIG. 2, each joint includes a motor 80 for driving the joint, an encoder 81 for detecting the rotation angle of the motor 80, and a motor controller 82 for controlling the motor 80 and encoder 81 by exchanging signals with the control apparatus 21.

The hand 23 is attached to and supported by a distal-end link 60 of the arm 22, and the degree of freedom of at least one of the position and posture is adjusted by the operation of the arm 22. The hand 23 includes two fingers 23a, and a hand main body 23b for supporting the fingers 23a such that they can be opened and closed. The hand 23 can grip the work 6 by a closing operation by which the fingers 23a move close to each other.

As shown in FIG. 2, the control apparatus 21 is configured by a computer, and controls the robot main body 20 and the camera 4. The computer configuring the control apparatus 21 includes a CPU 50, a RAM (storage unit) 51 capable of temporarily storing data, a ROM 52 which stores a program for controlling each unit, and an input/output interface circuit (I/F) 53 capable of communicating with the robot main body 20. Also, the control apparatus 21 functions as a pattern matching apparatus for executing pattern matching. Note that in this embodiment, although the control apparatus 21 functions as the pattern matching apparatus, the pattern matching apparatus may be provided as a separated apparatus from the control apparatus 21.

The ROM 52 stores, e.g., a pattern matching program 52a (to be described later), a robot control program for controlling the operation of the robot main body 20, and a calculation program for a position/posture calculation to be performed on the work 6 by the CPU 50. Data stored in the ROM 52 is held even when the power supply of the control apparatus 21 is turned off, except for write and erase from the CPU 50. The RAM 51 temporarily stores data currently being processed by the CPU 50, e.g., a search edge image 11 and model edge image (to be described later).

The CPU 50 includes a robot controller 54 for controlling the operation of the robot main body 20, and a pattern matching calculator (calculator) 55. The robot controller 54 controls the operation of the robot main body 20 by executing the robot control program.

Although the details are to be described later, the pattern matching calculator 55 performs pattern matching between the search edge image 11 and the model edge image 12 by executing the pattern matching program 52a.

More specifically, before an actual search process, the pattern matching calculator 55 causes the camera 4 to sense an image of the work 6 which is set in the position and posture of an ideal state as a designed image sensing position, and performs edge-extraction process for the work 6, thereby generating the model edge image 12. Also, before an actual search process, the pattern matching calculator 55 generates an edge extraction domain 13 as a domain in which the search edge image 11 is to be generated, in the search image 10 obtained by causing the camera 4 to sense an image of the work 6 gripped by the hand 23. The edge extraction domain 13 is a domain specified as a portion where the model edge image 12 can exist in the search image 10, in other words, where an image of the work 6 can exist when an actual search process. Then, the pattern matching calculator 55 performs pattern matching between the model edge image 12 and the search edge image 11 generated by performing edge extraction on the edge extraction domain 13 in the search image 10.

A procedure of generating the model edge image 12 for performing the pattern matching process and generating the edge extraction domain 13 in the search image 10 by the control apparatus 21 of the robot apparatus 2 will be explained with reference to a flowchart shown in FIG. 4. Note that a case in which the model edge image 12 is generated by using the camera 4 and control apparatus 21 of this embodiment will be explained below, but the present invention is not limited to this, and it is also possible to use another camera and another computer.

<Generation of Model Edge Image 12>

Figure 5A:
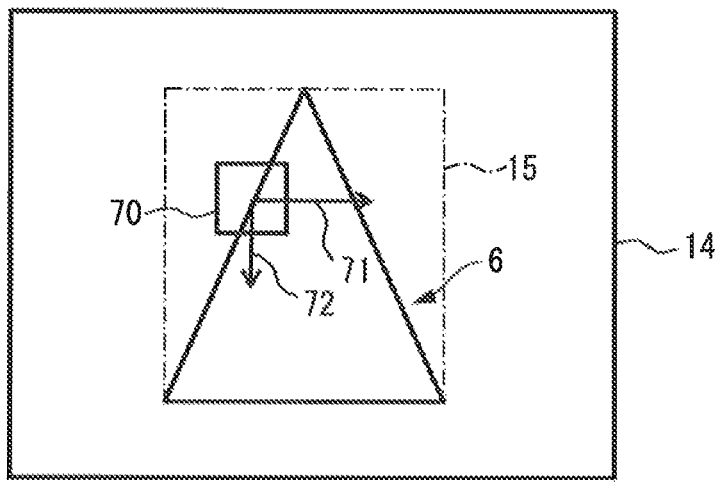
Figure 5B:
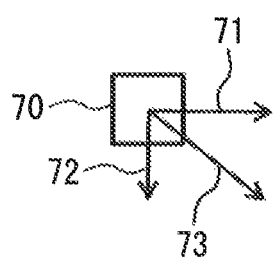
Figure 5C:
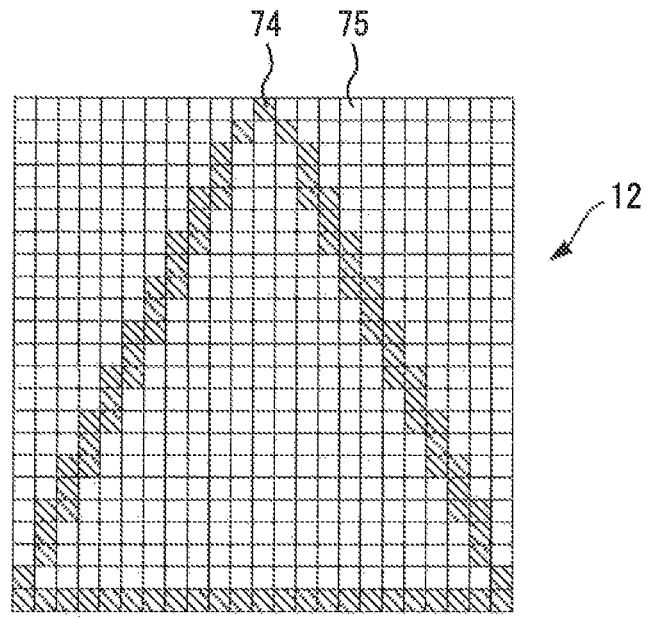

First, to generate a model edge image 12 for pattern matching, the work 6 is set in the position and posture of an ideal state as a designed image sensing position, the illumination conditions of the ideal state are set, and the camera 4 senses an image of the work 6. For example, the ideal state is desirably a state in which the positional relationship between the work 6 and camera 4 is horizontal, so an image of the work 6 can be sensed without any inclination. Also, the illumination conditions are desirably set such that the whole work 6 is illuminated with the same illumination. Then, as shown in FIG. 5A, a reference image 14 of a wide range containing the work 6 is obtained (step S1). Image data of the reference image 14 output from the camera 4 is input to and stored in the control apparatus 21.

An operator sets a rectangular domain around the work 6 to be detected in the reference image 14 displayed on a display or the like (see FIG. 5A). The setting method is to click the upper left point and lower right point of the domain containing the work 6 in the reference image 14 displayed on the display, by using a mouse or the like attached to the control apparatus 21. By using the positions of the two clicked points as the points in the upper left and lower right corners of the rectangular domain, only the rectangular domain is cut out from the reference image 14, and an image of this domain is set as a cut image 15 (step S2).

Then, the model edge image 12 is generated by performing edge extraction on the cut image 15 (step S3). In this step, the edge intensity and edge direction are calculated for each pixel of the cut image 15. That is, an edge is defined as a vector having an intensity and direction as elements in each pixel. The edge intensity represents the contrast; when the contrast of a pixel adjacent to a pixel of interest is high, the edge intensity of the pixel of interest is also high. The edge direction represents the direction of the contrast, and indicates a direction (angle) in which the edge intensity of a pixel of interest is highest.

The edge intensity is calculated by using Sobel filters in the X- and Y-axis directions, i.e., an edge intensity 71 in the X-axis direction and an edge intensity 72 in the Y-axis direction are calculated in a given pixel 70. Then, as indicated by equation (1), an edge intensity is represented by the root sum square of the edge intensities 71 and 72 in the two axial directions (see FIG. 5B). Note that a Sobel filter is used to calculate the edge intensity in this embodiment, but the present invention is not limited to this, and it is also possible to use a well-known edge extraction filter such as a Laplacian filter or Canny filter.

$$I = \sqrt{e_x^2 + e_y^2} \quad (1)$$

I: the edge intensity
$e_x$: the edge intensity 71 in the X-axis direction
$e_y$: the edge intensity 72 in the Y-axis direction The edge direction is calculated by using equation (2).

$$\theta = \tan^{-1}\left(\frac{e_y}{e_x}\right) \quad (2)$$

$\theta$: the edge direction
$e_x$: the edge intensity 71 in the X-axis direction
$e_y$: the edge intensity 72 in the Y-axis direction The edge intensities and edge directions of all pixels of the cut image 15 are calculated by the above-described method. Then, pixels whose edge intensities are equal to or larger than a predetermined threshold value are extracted as edge features, thereby generating the model edge image 12 (see FIG. 5C). A method of holding data of the model edge image 12 is as follows. That is, a 2-channel data area is formed for each pixel of the model edge image 12, a pixel 74 extracted as an edge feature is regarded as a valid pixel, information of the edge intensity is stored in the first channel, and information of the edge direction is stored in the second channel. For a pixel 75 not determined as an edge feature, an invalid value (e.g., 0) is stored. In the example shown in FIG. 5C, valid pixels 74 as edge features are hatched, and invalid pixels 75 are outlined.

Although the 2-channel data area is formed for each pixel in this embodiment, the present invention is not limited to this. For example, it is also possible to store a model edge image as a pair of two images, i.e., an edge intensity image storing only the edge intensity, and an edge direction image storing only the edge direction. Note that in this embodiment, the edge intensity is calculated by using a Sobel filter. However, the present invention is not limited to this, and it is also possible to use a generally known edge extraction filter such as a Laplacian filter or Canny filter.

<Generation of Edge Extraction Domain 13>

Subsequently, the generation of edge extraction domain 13 will now be explained in detail. First, the control apparatus 21 receives the preobtained model edge image 12 (step S4). Then, the operator designates a search range (i.e., translation search range and search rotation angle) required for pattern matching (steps S5 and S6). This designation changes in accordance with a use case, and is determined based on possible differences of the position and posture of the work 6 in an actual search process from those of the work 6 when the model edge image 12 is generated (i.e., the designed image sensing position). Also, the search range designated herein (i.e., translation search range and search rotation angle) will be called a geometric transformation parameter hereinafter.

Figure 3A:
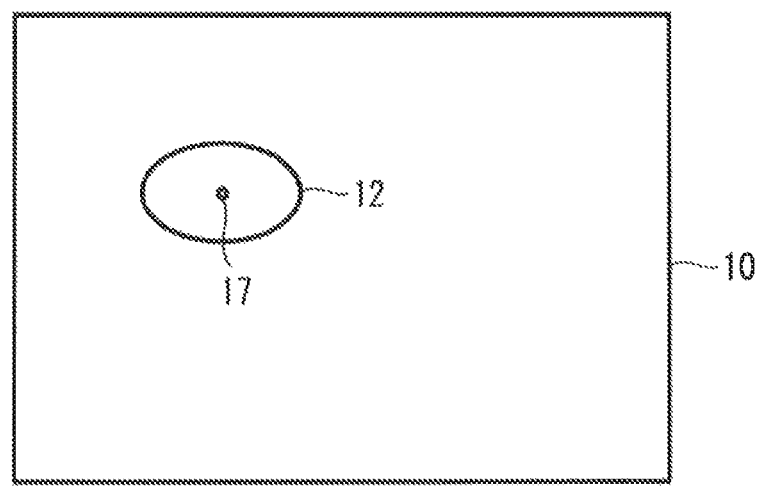
Figure 3B:
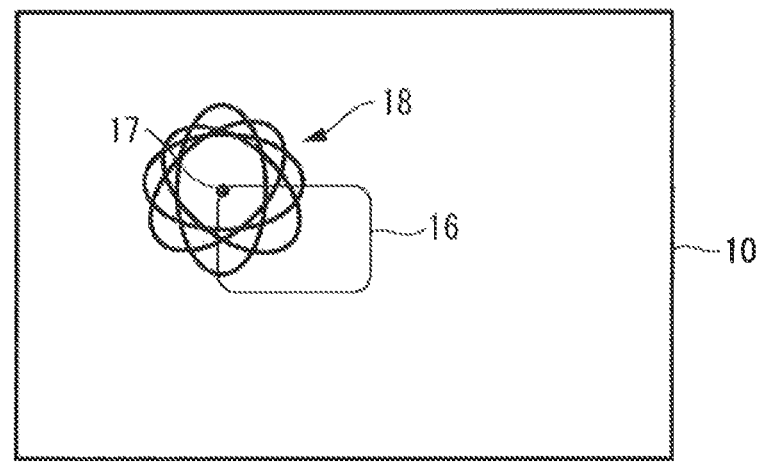
Figure 3C:
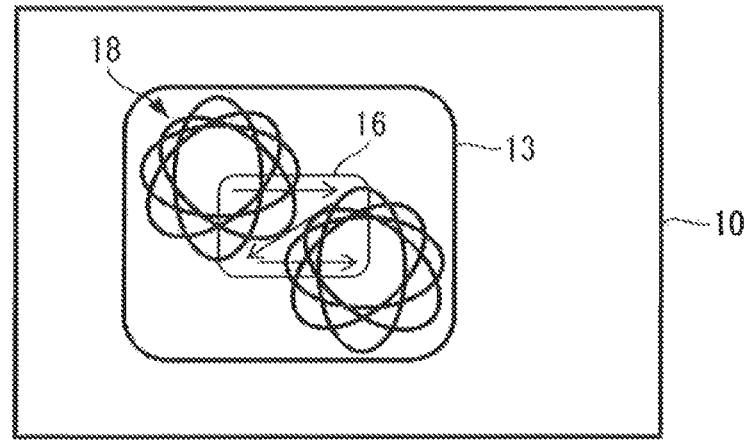

First, the control apparatus 21 sets a rotation center 17 in the model edge image 12 (see FIGS. 3A to 3C). In this embodiment, the rotation center 17 is the center of a bounding rectangle of the model edge image 12. Therefore, the rotation center 17 can be calculated within a short time even when the model edge image 12 is complicated. However, the rotation center 17 is not limited to the center of the bounding rectangle, and may also be, e.g., the barycenter, or the center of a bounding circle or inscribed circle. When applying the barycenter, it is possible to obtain a rotation center closer to that of the work 6.

Then, the operator first designates a translation search range (step S5). As shown in FIGS. 3A to 3C, a translation domain 16 is set as a domain having a predetermined range in which the rotation center 17 of the model edge image 12 can move. Note that "translation" herein mentioned means that the work 6 moves horizontally or vertically without rotation. Note also that the movement step of this translation is, e.g., one pixel step.

The operator then designates a search rotation angle (step S6). In this step, the operator sets a predetermined angle range in which the model edge image 12 can rotate, i.e., sets the range of errors which the work 6 can take when supplied from the work supply apparatus 3. For example, the operator designates a rotation angle from −90 deg to 90 deg. Also, the step of this rotation angle is, e.g., one deg step.

Note that in this embodiment, the operator first sets the translation domain 16 and then sets the search rotation angle. However, the present invention is not limited to this, and the operator may also set them in the reverse order or set them in parallel at the same time. Furthermore, the steps of the translation and rotation angle may be designated by the operator, and may also be fixed values so that the operator cannot designate them. In addition, the number of steps of the rotation angle may also be determined automatically based on the size of the model edge image 12.

When, for example, the work supply apparatus 3 supplies the work 6 with arranging the phase of the work 6, the rotation range of pattern matching can be set within a very small range. On the other hand, when the work supply apparatus 3 does not arrange the phase of the work 6, it is necessary set a rotation range of 360°.

Figure 6A:
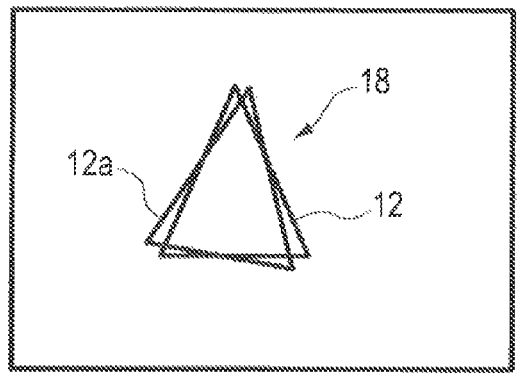
Figure 6B:
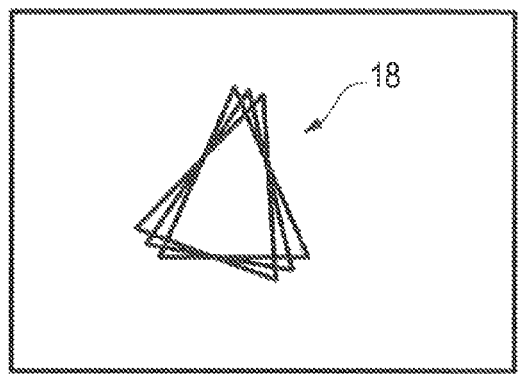
Figure 6C:
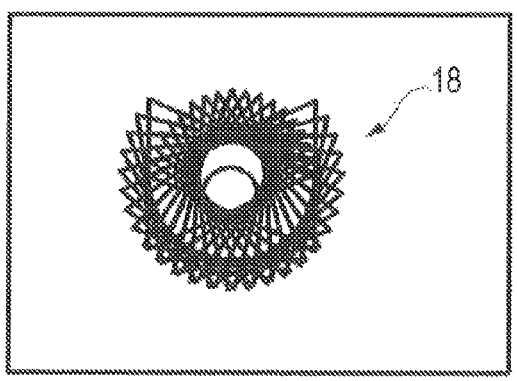
Figure 6D:
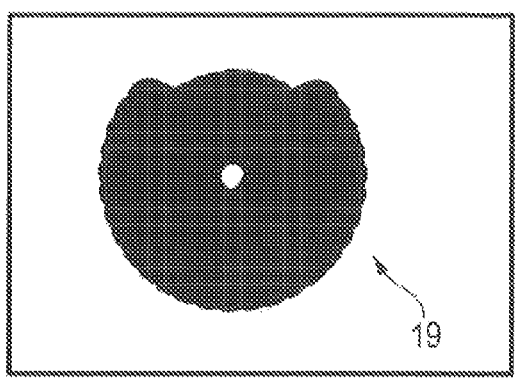

Then, the edge extraction domain 13 is generated based on the predesignated geometric transformation parameter (steps S7 to S12). First, the pattern matching calculator 55 determines whether the processing (rotation process) of the whole rotation range is complete (step S7). This determination is performed by a rotation counter which is counted up whenever the model edge image 12 is rotated. If the pattern matching calculator 55 determines that the processing of the whole rotation range is not complete, the pattern matching calculator 55 rotates the model edge image 12 by the designated rotation angle step (step S8). Then, the pattern matching calculator 55 calculates an edge domain sum from a rotated model edge image 12a and the model edge image 12 input in step S4, and forms a rotation shape sum domain 18 as shown in FIG. 6A (step S9).

Subsequently, the pattern matching calculator 55 determines whether the processing of the whole rotation range is complete again (step S7). By thus executing steps S7 to S9 for all angles of the search rotation angle designated at Step S6, the rotation shape sum domain 18 finally becomes that shown in FIG. 6C through a state shown in FIG. 6B.

If all the steps in the rotation direction are complete and the pattern matching calculator 55 determines that the processing of the whole rotation range is complete, the pattern matching calculator 55 determines whether the processing (translation process) of the whole translation range is complete (step S10). For example, this determination is performed by a translation counter which is counted up whenever the model edge image 12 is translated. If the pattern matching calculator 55 determines that the processing of the whole translation range is not complete, the pattern matching calculator 55 translates the pregenerated rotation shape sum domain 18 by the designated step within the search range designated in step S5 (step S11). The pattern matching calculator 55 calculates the sum of the translated rotation shape sum domain 18, and forms a shape sum domain 19 (step S12).

Then, the pattern matching calculator 55 determines whether the processing of the whole translation range is complete again (step S10). By thus executing steps S10 to S12 by using all the translation direction geometric transformation parameters, the shape sum domain finally becomes that shown in FIG. 6D. The pattern matching calculator 55 stores the shape sum domain 19 generated by the above-described procedure as the edge extraction domain 13. That is, the pattern matching calculator 55 forms the shape sum domain 19 by overlaying the plurality of obtained model edge images 12, and generates the edge extraction domain 13 by specifying the shape sum domain 19 as a portion where the model edge image 12 can exist. Note that steps S7 to S12 are equivalent to the extracted domain generation step of the present invention.

<Pattern Matching Process>

A procedure of executing the pattern matching process of actually detecting the work 6 by using the model edge image 12 and edge extraction domain 13 by the control apparatus 21 of the robot apparatus 2 will be explained with reference to a flowchart shown in FIG. 7.

First, the pattern matching calculator 55 receives the model edge image 12 (step S21), and receives the edge extraction domain 13 (step S22). Then, the pattern matching calculator 55 causes the camera 4 to sense an image of the work 6, and receives the search image 10 for performing pattern matching (step S23). In addition, the pattern matching calculator 55 performs the same method as above-described edge extraction process (step S3) for the edge extraction domain 13 in the search image 10 and extracts edge features, thereby generating the search edge image 11 (step S24). After that, the pattern matching apparatus calculator 55 performs pattern matching between the model edge image 12 and search edge image 11 (step S25, a pattern matching step).

As the method of pattern matching, the rotation center 17 of the model edge image 12 is moved pixel by pixel in the search edge image 11 with being rotated. Then, in each moved position, an image having a same size of the model edge image 12 is extracted from the search edge image 11. Subsequently, a similarity R between the extracted image and the model edge image 12 is obtained by the following equation (3). The similarity R is calculated every time the model edge image 12 is rotated by a given angle (e.g., 1 degree) and every time the center of the model edge image 12 is moved in the search edge image 11 by a given pixel (i.e., 1 pixel).

$$R_{ij\phi} = \frac{1}{n}\sum_{k=1}^{n}\cos|\theta I_k - \theta T_k| \quad (3)$$

$R_{ij\Phi}$: a similarity at a position (i, j) of the center of the model edge image 12 and a rotation angle $\Phi$ in the search edge image 11 n: the number of edges

θI: the edge direction of the search edge image 11

θT: the edge direction of the model edge image 12

In equation (3), the position in an image represents the position of the center of the model edge image 12 in the search edge image 11. Also, the range of the similarity R in equation (3) is 0 to 1; 0 is the lowest similarity, and 1 is the highest similarity. The pattern matching calculator 55 executes calculations by equation (3) at all coordinates of the translation domain 16 of the search edge image 11, and stores the coordinate point (i, j) and rotation angle $\Phi$ of a position where the similarity R is highest. The pattern matching calculator 55 then sets the coordinate point (i, j) and rotation angle $\Phi$ of the position where the similarity R is highest and the rotation angle as the detection position and detection angle (phase) of the work 6 of the search edge image 11, and calculates the detection position and detection angle of the work 6 in the search image 10.

In the control apparatus 21 of this embodiment as described above, the pattern matching calculator 55 sets the edge extraction domain 13 in the search image 10 as a domain specified as a portion where the model edge image 12 can exist in the search image 10. Since, therefore, the edge extraction domain 13 can be specified by omitting portions unnecessary for pattern matching from the search image 10, the speed of the pattern matching process can be increased. In addition, no specific shape feature such as a corner is used, the pattern matching process can be executed regardless of the shape of the work 6.

Also, in the control apparatus 21 of this embodiment, the pattern matching calculator 55 generates the rotation shape sum domain 18 by rotating the model edge image 12, and forms the shape sum domain 19 by translating the rotation shape sum domain 18. Accordingly, a minimum necessary edge extraction domain 13 can be generated.

Furthermore, in the control apparatus 21 of this embodiment, the rotation center 17 of the model edge image 12 is set as the center of the bounding rectangle, and set as almost the same position as the barycentric position. Accordingly, the operator can intuitively narrow down the geometric transformation parameter setting range. Since this increases the speed of pattern matching and further narrows down the edge extraction domain 13, the processing time of edge extraction is further shortened.

Second Embodiment

Next, a robot system 1 according to the second embodiment will be explained.

Figure 9A:
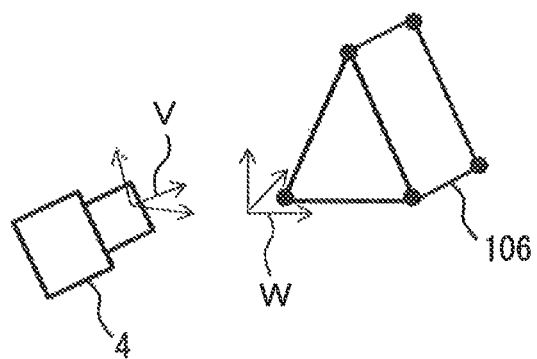
Figure 9B:
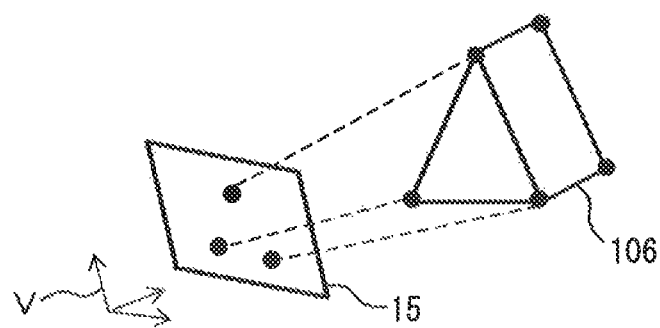

In the second embodiment, a model edge image 12 is formed based on three-dimensional shape data 106 of CAD as design data of a work 6 as shown in FIGS. 9A and 9B, when compared to the first embodiment. Also, when forming an edge extraction domain 13 in the second embodiment, a shape sum domain is formed for an enlargement/reduction range in addition to a rotation range and translation range, when compared to the first embodiment. That is, the second embodiment takes account of a case in which the distance between the work 6 and a camera 4 changes accordingly and the size of the work 6 in a search edge image 11 changes in an actual search process.

The difference of this embodiment from the first embodiment is processing in a pattern matching calculator 55. Since, however, the hardware configuration is the same as that of the first embodiment, the same reference numerals denote the same parts, and a detailed explanation will be omitted. Note that in this embodiment, the model edge image 12 is generated by using the three-dimensional data 106 of the work 6, and the shape sum domain is formed for the enlargement/reduction range as well. However, these features have no direct relationship, so only one of them may also be applied.

Figure 8:
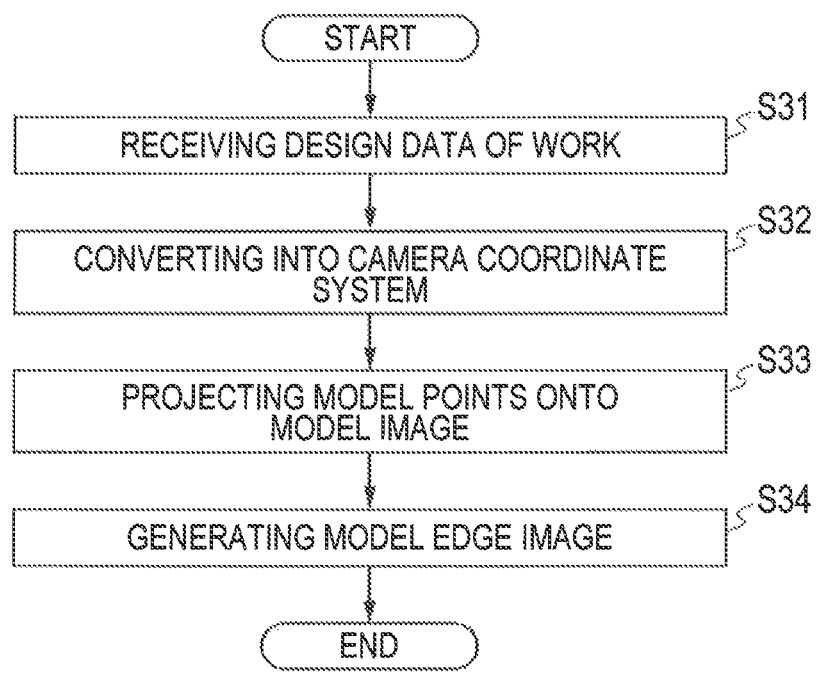
FIG. 8 is a flowchart showing a procedure of generating a model edge image by a pattern matching apparatus according to the second embodiment of the present invention.

A procedure of generating the model edge image 12 for performing a pattern matching process by a control apparatus 21 of an above-described robot apparatus 2 will be explained with reference to FIG. 8.

First, a control apparatus 21 which functions as a pattern matching apparatus forms the three-dimensional shape data 106 based on the design data of the work 6 (step S31). The three-dimensional shape data has a three-dimensional coordinate system W (x, y, z) of a portion representing the shape of the work 6. To simplify the explanation, it is assumed in this embodiment that the three-dimensional shape data has the three-dimensional coordinate system W (x, y, z) at only the apex position of the work 6 as shown in FIG. 9A. The control apparatus 21 converts the three-dimensional coordinate system W of the three-dimensional shape data 106 into a camera coordinate system V, based on the arrangement of the camera 4 and work 6 in an actual search process (step S32).

In addition, as shown in FIG. 9B, the control apparatus 21 projects the three-dimensional shape data 106 converted into the camera coordinate system V onto a cut image 15 (step S33). When projecting the three-dimensional shape data 106 to the cut image 15, processing is performed by:

$$x_{pix} = (f \times x/z)/S_x + C_x$$

$$y_{pix} = (f \times x/z)/S_x + C_x \quad (4)$$

f: a focal length
$S_x$, $S_y$: pitch widths between sensor elements in the x and y directions
$C_x$, $C_y$: an image central point In equations (4), the focal length, sensor pitch widths, and image central point are parameters unique to the camera 4, and can be calculated by performing camera calibration in advance.

Then, based on the obtained cut image 15, the control apparatus 21 generates the model edge image 12 by the same method as in step S3 of the first embodiment (step S34).

Figure 10:
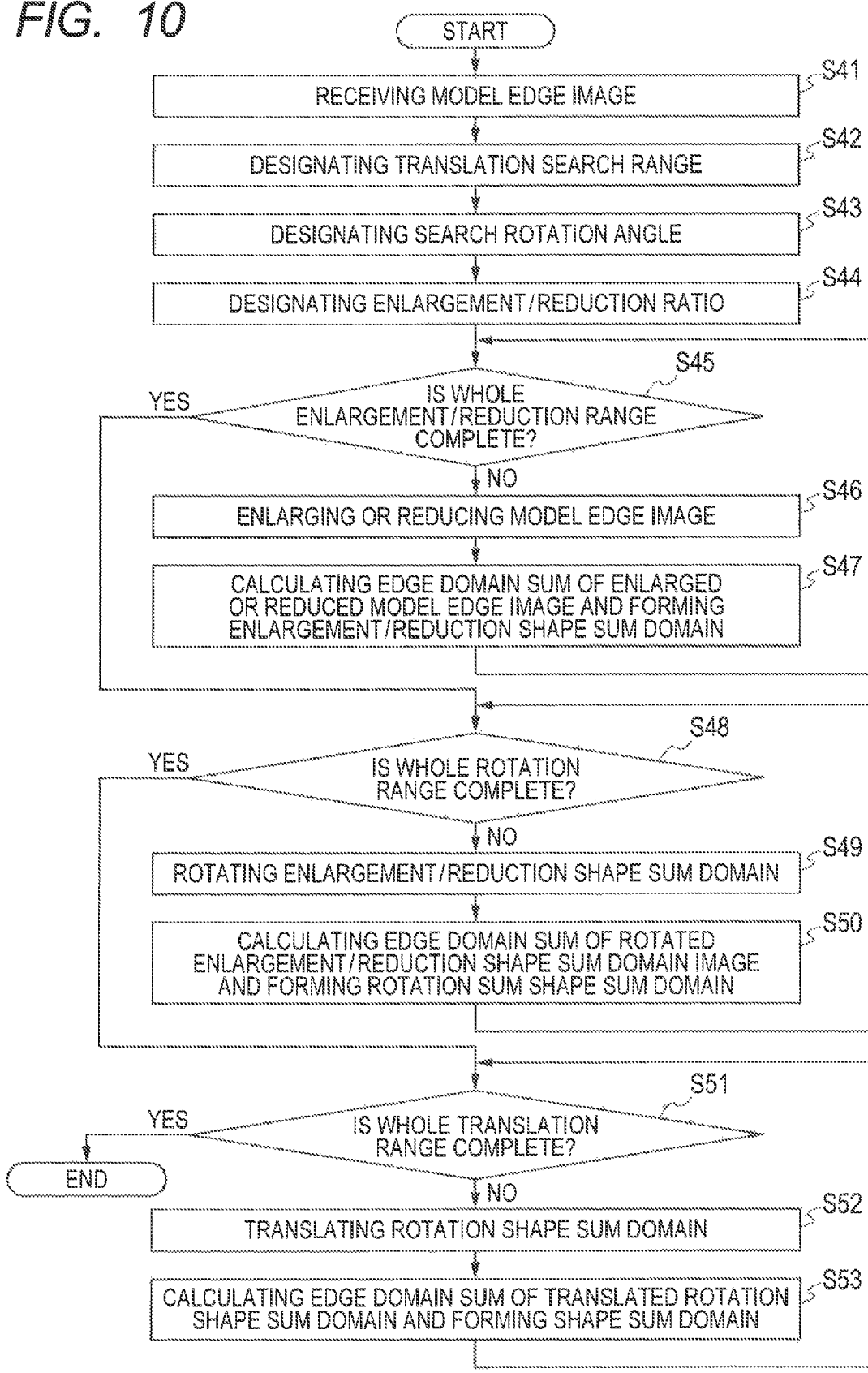
FIG. 10 is a flowchart showing a procedure of generating an edge extraction domain by the pattern matching apparatus according to the second embodiment of the present invention.

Next, a process of generating the edge extraction domain 13 in a search image 10 by the control apparatus 21 of a robot apparatus 2 described above will be explained with reference to a flowchart shown in FIG. 10.

First, to generate the edge extraction domain 13, the control apparatus 21 receives the preobtained model edge image 12 (step S41). Then, an operator designates a search range required for pattern matching (steps S42 to S44). Step S42 for setting a translation domain and step S43 for setting a search rotation angle are respectively the same as steps S5 and S6 of the first embodiment, so a detailed explanation will be omitted.

After setting a translation domain 16 and the search rotation angle, the operator designates the enlargement/reduction ratio (step S44). In this step, a predetermined range in which the model edge image 12 can be enlarged or reduced, i.e., the range of errors which the work 6 can take when it is acquired from a work supply apparatus 3 is set in accordance with the distance between the camera 4 and work 6. For example, the operator designates the enlargement/reduction ratio as 90% to 110%. Enlargement/reduction is performed around a rotation center 17 of the model edge image 12. Assuming that the size of the model edge image 12 when it is formed is 100%, 90% and 110% respectively mean a reduction and enlargement of 10%. Also, the step of the enlargement/reduction ratio is, e.g., a 1% step.

In this step, the ranges of the translation and enlargement/reduction can be determined in accordance with the operation accuracy of the robot apparatus 2. That is, when the robot apparatus 2 moves the work 6 to the image sensing range of the camera 4, the translation range can be determined by the error range at a position in the image sensing range, and the enlargement/reduction range can be determined by the error range in the optical axis direction of the camera 4.

Note that the enlargement/reduction in this specification includes at least one of enlargement and reduction, and may include only one of them. Also, in this embodiment, the operator sets the translation domain 16, search rotation angle, and enlargement/reduction ratio in this order. However, the present invention is not limited to this, and it is also possible to set them in another order or set them in parallel at the same time as in the first embodiment. Furthermore, the steps of the translation, rotation angle, and enlargement/reduction ratio may be designated by the operator, and may also be fixed values so that the operator cannot designate them.

Then, the edge extraction domain 13 is formed based on a predesignated geometric transformation parameter (steps S45 to S53). First, the pattern matching calculator 55 determines whether the processing (enlargement/reduction process) of the whole enlargement/reduction range is complete (step S45). This determination is performed by an enlargement/reduction counter which is counted up whenever the model edge image 12 is enlarged or reduced. If the pattern matching calculator 55 determines that the processing of the whole enlargement/reduction range is not complete, the pattern matching calculator 55 enlarges or reduces the model edge image 12 by the designated step of the enlargement/reduction ratio (step S46). After that, the pattern matching calculator 55 calculates the sum of edge domains of the enlarged or reduced model edge image and the model edge image 12 input in step S41, and forms an enlargement/reduction shape sum domain (step S47).

Subsequently, the pattern matching calculator 55 determines whether the processing of the whole enlargement/reduction range is complete again (step S45). A final enlargement/reduction shape sum domain is obtained by thus executing steps S45 to S47 by using all the enlargement/reduction geometric transformation parameters.

When all the steps of enlargement/reduction are complete and the pattern matching calculator 55 determines that the processing of the whole enlargement/reduction range is complete, the pattern matching calculator 55 determines whether the processing of the whole rotation range is complete (step S48). Steps S48 to S53 are the same as steps S7 to S12 of the first embodiment, so a detailed explanation will be omitted. The pattern matching calculator 55 stores the shape sum domain 19 generated by the above-described procedure as the edge extraction domain 13. Note that steps S45 to S53 are equivalent to the extracted domain generation step of the present invention.

The pattern matching calculator 55 executes the pattern matching process of actually detecting the work 6 by using the model edge image 12 and edge extraction domain 13. This pattern matching process is the same as steps S21 to S25 of the first embodiment, so a detailed explanation will be omitted.

In the control apparatus 21 of this embodiment as described above, the edge extraction domain 13 can be specified by omitting portions unnecessary for pattern matching from the search image 10, in the same manner as in the first embodiment. Accordingly, the speed of the pattern matching process can be increased. In addition, it is unnecessary to use any specific shape feature such as a corner, so the pattern matching process can be executed regardless of the shape of the work 6.

Also, the control apparatus 21 of this embodiment generates the model edge image 12 based on the three-dimensional shape data 106. Therefore, an operator need not perform any operation of sensing an image of an actual work 6, and the model edge image 12 can be obtained by only arithmetic processing. This makes it possible to simplify the process of generating the model edge image 12, and shorten the processing time.

Furthermore, in the control apparatus 21 of this embodiment, the pattern matching calculator 55 generates the enlargement/reduction shape sum domain by enlarging or reducing the model edge image 12. Then, the pattern matching calculator 55 generates the rotation shape sum domain 18 by rotating the enlargement/reduction shape sum domain, and forms the shape sum domain 19 by translating the rotation shape sum domain 18. In the process of actually searching for the work 6, therefore, even when the distance between the camera 4 and work 6 changes and the size of the work 6 in the search image 10 changes accordingly, the fluctuation ranges of the position and size of the work 6 can be matched with the edge extraction domain 13. Accordingly, a minimum necessary edge extraction domain 13 can be generated.

In addition, when generating the edge extraction domain 13, the control apparatus 21 of this embodiment processes the model edge image 12 in the order of the enlargement/reduction process, rotation process, and translation process. That is, the processes of enlargement/reduction and rotation are performed before translation. Therefore, when, for example, the translation range is wide and rotation and enlargement/reduction are performed after a large translation shape sum domain is formed, it may become impossible to narrow down to a minimum edge extraction domain 13. The embodiment can prevent the occurrence of this possibility.

When generating the edge extraction domain 13, as described above, the control apparatus 21 performs the enlargement/reduction process, rotation process, and translation process in the order named. However, the present invention is not limited to this, and it is also possible to perform these processes in the order of, e.g., the rotation process, enlargement/reduction process, and translation process. Alternatively, the translation process man also be performed first if a minimum edge extraction domain 13 is obtained even when rotation, enlargement/reduction, and the like are performed after translation.

Also, the control apparatus 21 of this embodiment described above executes the three processes, i.e., the enlargement/reduction process, rotation process, and translation process, but the present invention is not limited to this. For example, it is also possible to execute only the two processes, i.e., the rotation process and translation process as in the first embodiment, or execute other two processes or only one process. It is possible to appropriately select these processes in accordance with, e.g., the shape of the work 6, the position/posture relationship with the camera 4, and the required processing time and accuracy.

Note that the processing operations of the above-described embodiments are practically executed by the pattern matching calculator 55. Therefore, the above-described functions may also be achieved by supplying a recording medium recording a program for implementing the functions to the pattern matching calculator 55, and reading out and executing the pattern matching program 52a stored in the recording medium by the CPU 50 of the pattern matching calculator 55. In this case, the program itself read out from the recording medium implements the functions of the above-described embodiments, and the program itself and the recording medium recording the program constitute the present invention.

Note also that in the embodiments, the case in which a computer-readable recording medium is the ROM 52 and the pattern matching program 52a is stored in the ROM 52 has been explained. However, the present invention is not limited to this. The program can be recorded on any recording medium as long as the medium is a computer-readable recording medium. For example, it is possible to use, e.g., an HDD, external storage device, or recording disk as the recording medium for supplying the program.

In the present invention, when generating an edge extraction domain in a search image, the calculator sets, as the edge extraction domain, a domain specified as a portion where a model edge image can exist in the search image. Therefore, the edge extraction domain can be specified by omitting portions unnecessary for pattern matching from the search image. This makes it possible to increase the speed of the pattern matching process. In addition, it is unnecessary to use any specific shape feature such as a corner. Accordingly, the pattern matching process can be executed regardless of the shape of a detection target.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-144164, filed Jul. 10, 2013, which is hereby incorporated by reference herein in its entirety.

What is claimed is:

1. A pattern matching method of detecting an image of a detection target from a search image obtained by imaging the detection target by performing pattern matching between the search edge image and a model edge image concerning the detection target, comprising:

obtaining a reference image of the detection target;
generating the model edge image on a basis of the reference image;
generating the edge extraction domain that is specified as a portion where the model edge image can exist by overlying a plurality of the model edge images obtained with at least one of (i) a rotation process of rotating the model edge image within a predetermined range around a rotation center of the model edge image, (ii) an enlargement/reduction process of enlarging/reducing the model edge image within a predetermined range around the rotation center, and (iii) a translation process of translating the model edge image within a predetermined range; and
performing pattern matching between the model edge image and the search edge image generated by performing edge extraction process for the edge extraction domain in the search image;
a first step of rotating the model edge image on the search edge image by a given angle or enlarging/reducing the model edge image on the search edge image by a given enlargement/reduction ratio, and calculating a similarity between the model edge image and the search edge image based on edge directions of the model edge image and the search edge image;
a second step of moving a center of the model edge image on the search image by a given pixel, and calculating a similarity between the model edge image and the search edge image based on the edge directions of the model edge image and the search edge image;
repeating the first and second steps; and
outputting a position and rotation angle or enlargement/reduction ratio in the search edge image of the model edge image having a highest similarity as pattern matching results.

2. A method according to claim 1, wherein the rotation center is a barycenter of the model edge image in the rotation process.

3. A method according to claim 1, wherein the rotation center is a center of a bounding rectangle of the model edge image in the rotation process.

4. A method according to claim 1, wherein the rotation process and the enlargement/reduction process are performed before the translation process.

5. A non-transitory computer-readable recording medium recording a pattern matching program for causing a computer to execute each step of a pattern matching method cited in claim 1.

6. A pattern matching apparatus comprising:
a storage unit configured to store at least the search edge image and the model edge image; and
a calculator configured to perform pattern matching between the search edge image and the model edge image,
wherein the calculator executes the pattern matching method of claim 1.

7. A robot system comprising:
a robot apparatus configured to perform processing on a work;
a work supply apparatus configured to supply the work to the robot apparatus;
a camera configured to sense an image of the work supplied to the robot apparatus by the work supply apparatus; and
the pattern matching apparatus of claim 6 configured to generate the search edge image by using the image of the work sensed by the camera as the search image, and perform pattern matching between the search edge image and the model edge image generated based on the work, thereby detecting a position of the work in the search image.

* * * * *